US006916239B2

(12) United States Patent
Siddaramanna et al.

(10) Patent No.: US 6,916,239 B2
(45) Date of Patent: Jul. 12, 2005

(54) AIR QUALITY CONTROL SYSTEM BASED ON OCCUPANCY

(75) Inventors: Lokesh T. Siddaramanna, Tumkur District Karnataka (IN); Arjuna Rao Chavala, Andhra Pradesh (IN)

(73) Assignee: Honeywell International, Inc., Morristown, NJ (US)

( * ) Notice: Subject to any disclaimer, the term of this patent is extended or adjusted under 35 U.S.C. 154(b) by 159 days.

(21) Appl. No.: 10/127,519

(22) Filed: Apr. 22, 2002

(65) Prior Publication Data

US 2003/0199244 A1 Oct. 23, 2003

(51) Int. Cl.$^7$ ................................................. F24F 7/00
(52) U.S. Cl. ...................... 454/256; 236/49.1; 236/49.3
(58) Field of Search ............................... 454/256, 333, 454/239, 229

(56) References Cited

U.S. PATENT DOCUMENTS

| | | | | |
|---|---|---|---|---|
| 4,294,404 A | * | 10/1981 | Gajjar ........................ | 236/49.3 |
| 4,407,447 A | * | 10/1983 | Sayegh ....................... | 236/49.3 |
| 5,326,028 A | * | 7/1994 | Kano et al. ................. | 236/49.3 |
| 5,464,369 A | * | 11/1995 | Federspiel ................... | 454/256 |
| 5,779,538 A | * | 7/1998 | Jardinier ..................... | 454/256 |
| 6,295,823 B1 | * | 10/2001 | Odom et al. ............... | 62/176.6 |
| 6,645,066 B2 | * | 11/2003 | Gutta et al. ................. | 454/229 |

OTHER PUBLICATIONS

John J. Lauria, III, Carrier Corporation, "How Demand Controlled Ventilation Increases Air Quality and Reduces Costs", 1$^{st}$ page and 1–5 and last page.
M. Schell, "Proven Energy Savings with DCV retrofits Using $CO_2$ levels to vary fresh air rate saves energy and assures good IAQ", 5 pgs.
Schell et al., "Application of CO2–Based Demand Controlled Ventilation Using ASHRAE Standard 62: Optimizing Energy Use and Ventilation", 1$^{st}$ pg. & p. 1213–1225.
ComfortID System.
Timmons et al., "Off–Peak Building Control Considerations Utilizing $CO_2$ Based Demand–Controlled Ventilation (DCV) with Large Packaged Rooftop Units", 12 pgs.
Brandemuehl, Ph.D., P.E., "The Impact of Demand–Controlled and Economizer Ventilation Strategies on Energy Use in Buildings", 12 pgs.

* cited by examiner

Primary Examiner—Derek S. Boles
(74) Attorney, Agent, or Firm—Schiff Hardin LLP

(57) ABSTRACT

Air quality within a building is controlled by maintaining a count of people in the building and by ventilating the building with an amount of air dependent on the count. The count may be determined in accordance with an access control system and/or entry and exit sensors, such as infrared sensors.

25 Claims, 5 Drawing Sheets

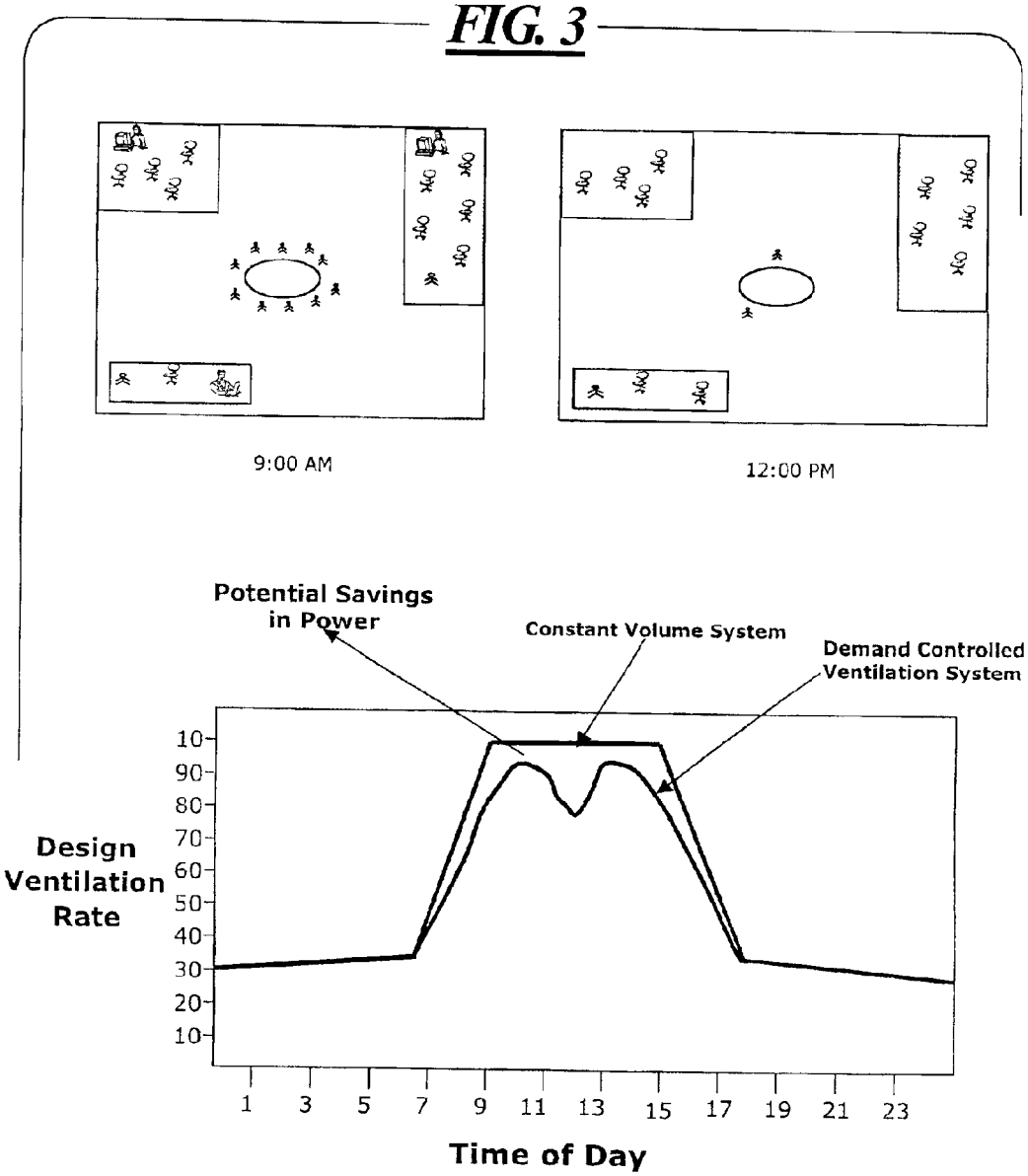

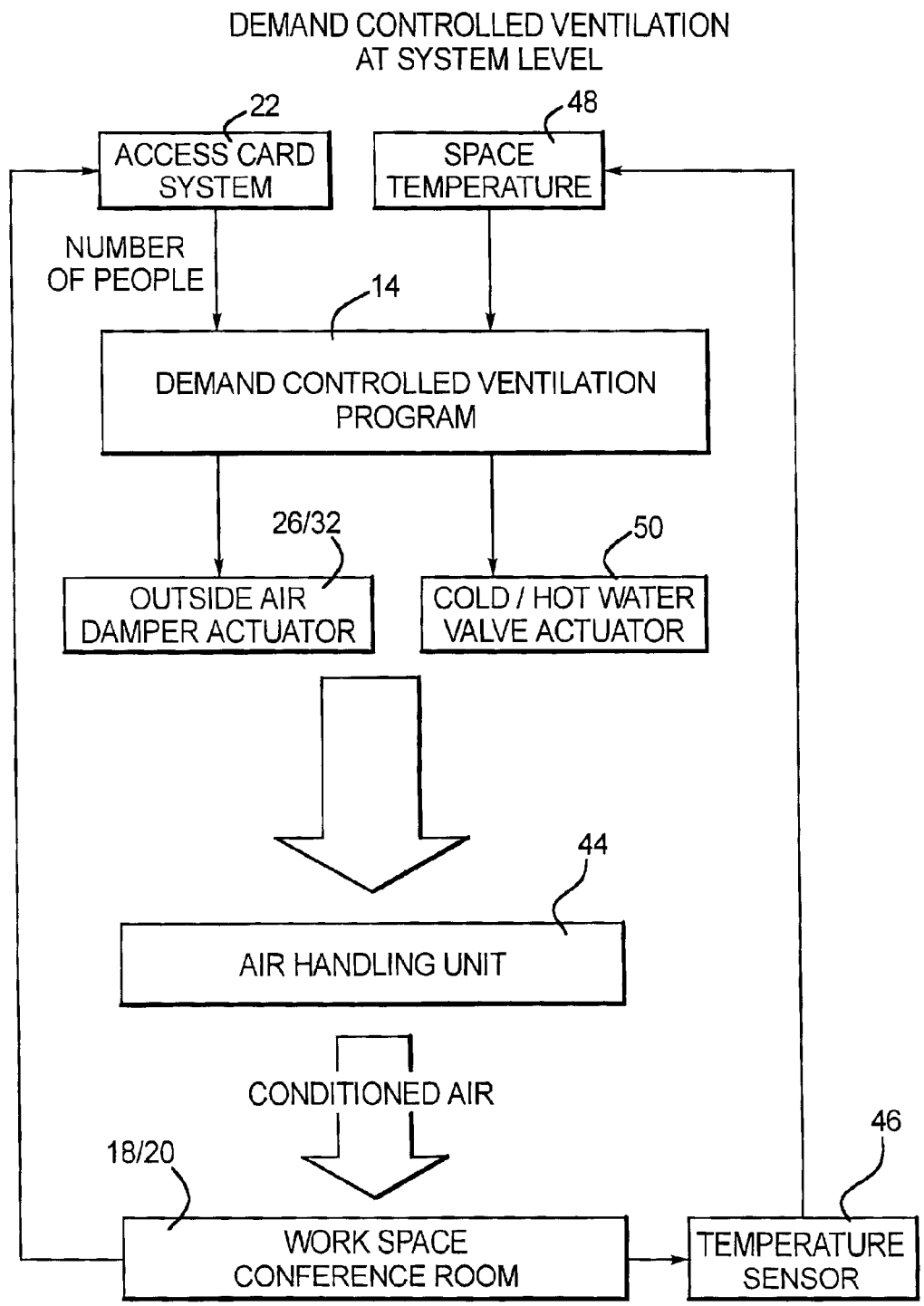

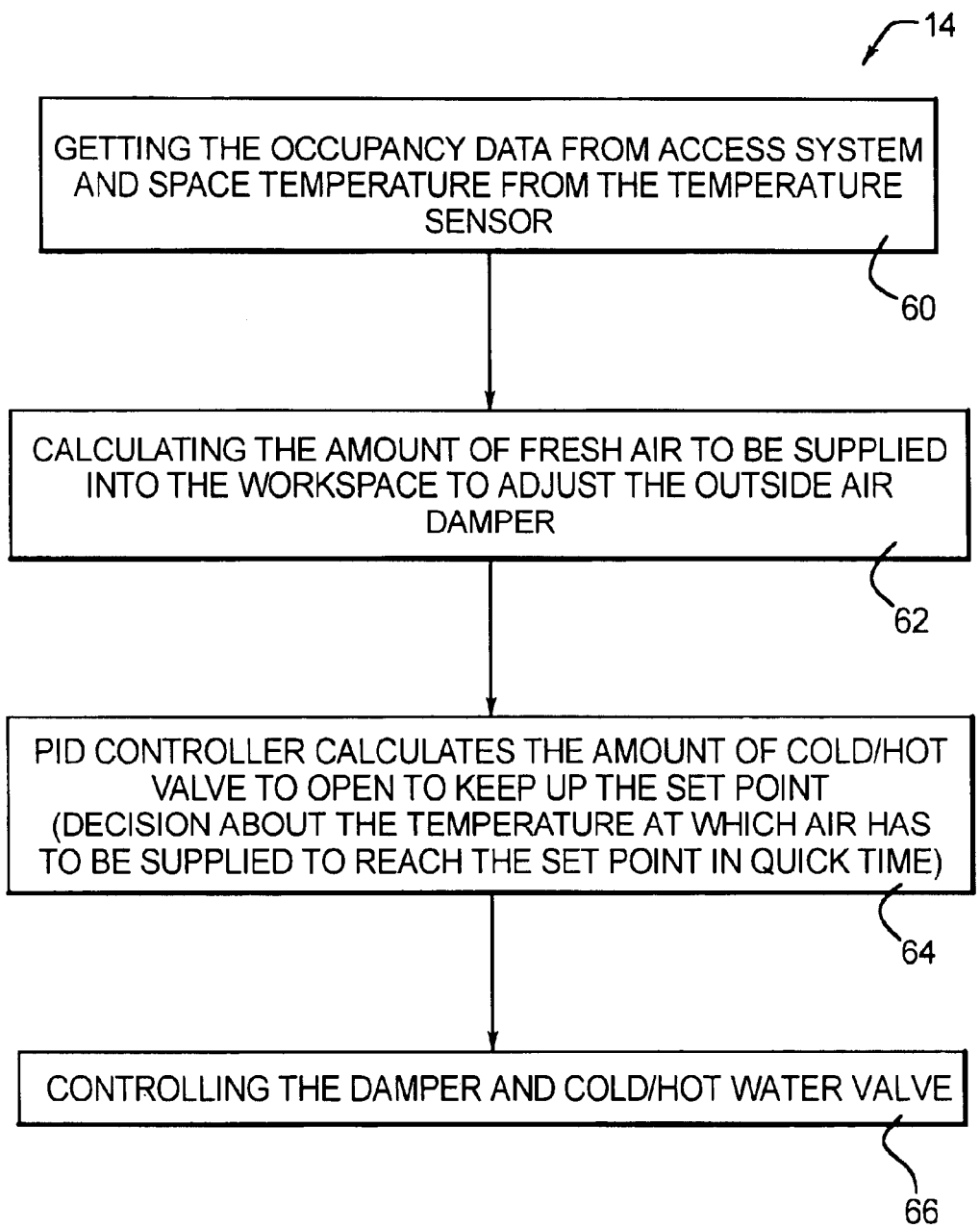

AIR QUALITY CONTROL SYSTEM BASED ON OCCUPANCY

TECHNICAL FIELD OF THE INVENTION

The present invention relates to the control of air quality in a building and, more particularly, to the control of air quality based on the number of the building's occupants.

BACKGROUND OF THE INVENTION

The term "HVAC" (Heating, Ventilating, and Air Conditioning) is applied to equipment that provides conditioned air to a building space by heating and/or cooling filtered outdoor air in order to maintain desired temperature and humidity conditions within the building space. Depending on outdoor air conditions, on the equipment within the building, and on human comfort requirements, the filtered outdoor air is heated and/or cooled before it is distributed into the building space. As outdoor air is drawn into the building, indoor air is exhausted or allowed to escape from the building, thus removing air contaminants from the building.

Generally, there are two types of HVAC systems of the kind described above, constant air volume systems and variable air volume systems. Constant air volume systems, as their name suggests, typically deliver a constant airflow to each building space. Changes in space temperatures are made by heating and/or cooling the air or by switching an air-handling unit on and off. Accordingly, constant air volume systems do not modulate the volume of air supplied to the building spaces. These constant air volume systems often operate with a fixed minimum percentage of outdoor air or with an air economizer.

In constant air volume systems, the volume of outside air supplied to the building space is constant, irrespective of occupancy. Therefore, a higher than expected occupancy results in poor indoor air quality, and a lower than expected occupancy leads to a waste of energy.

Variable air volume systems maintain the comfort level of a building space by varying the amount of heated and/or cooled air delivered to the building space, and by controlling the air temperature as required. The volume of the outside air supplied to the building space is changed in order to maintain the temperature constant. Alternatively, the speed of the blower fan is controlled to maintain a constant temperature.

However, variable air volume systems have limitations. For example, the relationship between a change in temperature of the building space and the fresh air required to meet indoor air quality standards is not a linear one. This non-linearity presents unnecessary obstacles to the system designer and often leads to poor indoor air quality. Also, temperature is often the primary control factor. Therefore, compromises on air quality are often made.

In current HVAC systems, the ventilation rate for a building depends on its design occupancy, rather than on the actual occupancy in the building. Selecting the ventilation rate according to the design occupancy of the building means that the indoor air quality is poor when occupancy exceeds the design occupancy, that the HVAC system consumes excessive power during periods when occupancy is substantially lower than the design occupancy, and that the air quality standards often are not met due to the non-linearity between the desired temperature and air quality. This latter problem occurs because indoor air quality maintained by a variable air volume system varies with occupancy in order to maintain a set temperature. Thus, even though care is taken in the design of variable air volume systems, 100% air quality control is not ensured.

In the case of constant air volume systems, care is taken primarily to maintain the temperature, and not much importance is given to indoor air quality. Similarly, in the case of variable air volume systems, the volume of air is changed to maintain the set point temperature, but less care is given to air quality. Such systems do not adequately maintain indoor air quality, If people are working in a place where indoor air quality is poor, their working efficiency tends to go down, and they may suffer long-term health problems.

Demand controlled ventilation systems that rely on $CO_2$ sensors as inputs are also known. In such systems, the amount of outdoor (fresh) air brought into a building space is dependent on the level of $CO_2$ and the $CO_2$ level is, at least theoretically, dependent on the number of occupants. Thus, as the $CO_2$ level increases, more outdoor air is brought into the building space, and as the $CO_2$ level decreases, less outdoor air is brought into the building space. However, such systems have several problems. For example, $CO_2$ sensors are costly. Also, the data obtained from the sensors vary rapidly. For example, $CO_2$ sensors are too sensitive to the proximity of people, and the values of $CO_2$ as measured by $CO_2$ sensors depends on their positioning within the building in which they are used. Also, sensitivity varies between sensors, and with aging of the sensors.

The present invention overcomes one or more of these or other problems of prior ventilation control systems.

SUMMARY OF THE INVENTION

In accordance with one aspect of the present invention, a method of controlling air quality comprises the following: maintaining a count of people in an area to be ventilated; and, ventilating the area with an amount of air dependent on the count.

In accordance with another aspect of the present invention, a method of controlling air quality comprises the following: maintaining a first count of people in a first space to be ventilated; maintaining a second count of people in a second space to be ventilated, wherein the first and second spaces are within the same building, and wherein the first and second counts are separate counts; ventilating the first space with an amount of air dependent on the first count; and, ventilating the second space with an amount of air dependent on the second count.

In accordance with still another aspect of the present invention, a method of controlling air quality comprises the following: maintaining a first count of people in a first space to be ventilated; maintaining a second count of people in a second space to be ventilated, wherein the first and second spaces are within the same building, and wherein the first and second counts are separate counts; controlling a first damper to supply fresh air to the first space dependent on the first count; and, controlling a second damper to supply fresh air to the second space dependent on the second count.

BRIEF DESCRIPTION OF THE DRAWINGS

These and other features and advantages of the present invention will become more apparent from a detailed consideration of the invention when taken in conjunction with the drawings in which:

FIG. 3 illustrates a comparison between a constant air volume system and the demand control ventilation system of FIG. 2;

FIG. 4 illustrates a physical layer of the demand control ventilation system of FIG. 2; and, FIG. 5 illustrates a flow chart representing the demand control ventilation program that is part of the demand control ventilation system of FIG. 2.

DETAILED DESCRIPTION

One embodiment of the present invention relates to demand control ventilation based on a count of the number of people within a building. This count may be derived, for example, from an access control system that monitors access by occupants to the building. This embodiment of the present invention overcomes the limitations of constant air volume and variable air volume systems by modifying air supply rates based on changing occupancy levels within the building.

Thus, the demand control ventilation system of this embodiment of the present invention determines the number of people in a building space, and thereby allows the air intake rates to be set based on the indicated occupancy. As a result, the outside air intake rate can be set at a level to assure an indoor air quality that meets existing standards, and can frequently be controlled at a level below that required for the maximum expected occupancy, thus saving energy.

The American Society of Heating, Refrigerating and Air-Conditioning Engineers Inc. (ASHRAE), in standard 62-1999 entitled "Ventilation for acceptable indoor air quality," sets the $CO_2$ level at or below the 1000 ppm mark for good indoor air quality. A $CO_2$ level above this mark is a result of poor ventilation, and a $CO_2$ level below this mark results from over-ventilation.

Figure 1:
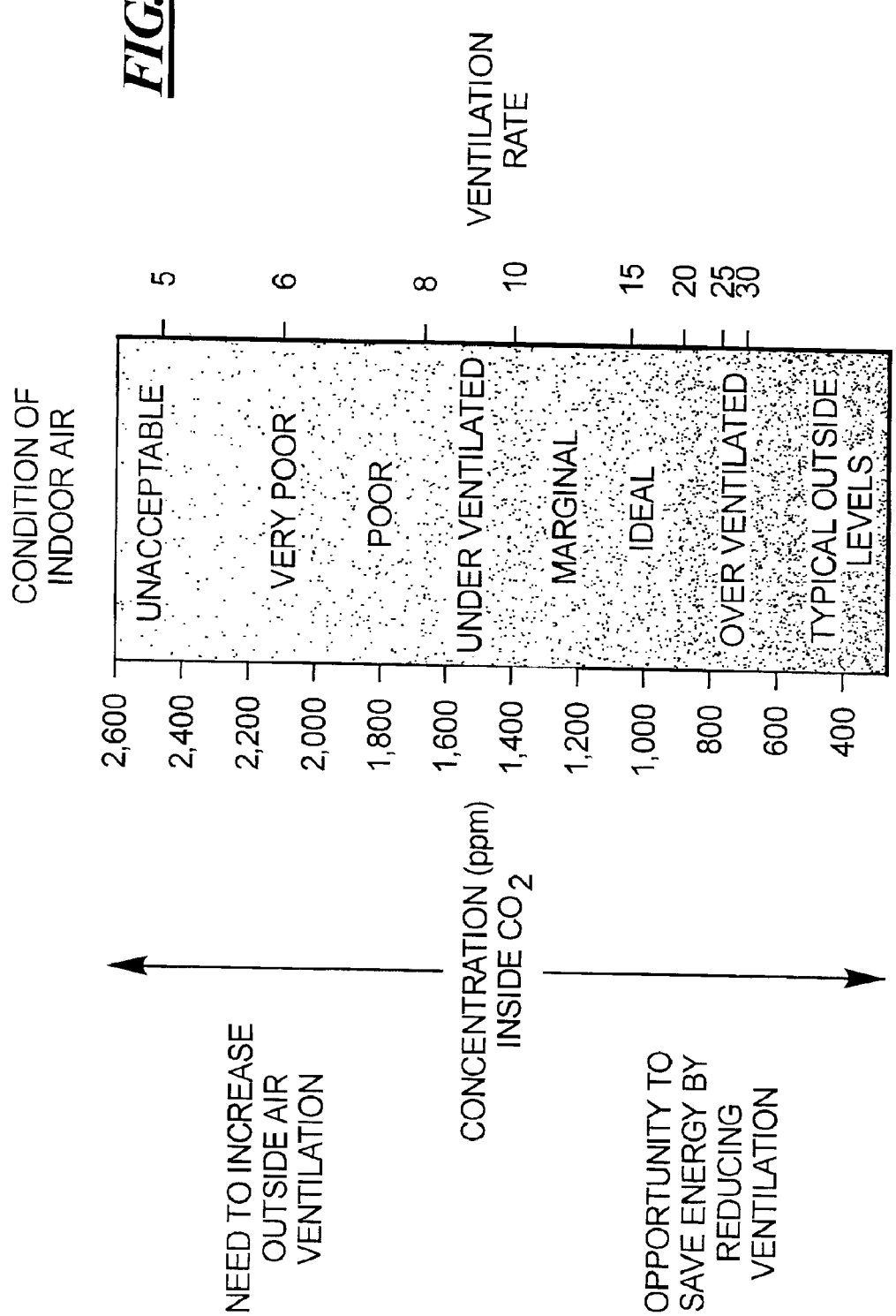
FIG. 1 illustrates the relationship between $CO_2$ level and ventilation rates in a closed space.

FIG. 1 shows the relationship between $CO_2$ level and ventilation rates in a closed space. As can be seen from FIG. 1, a ventilation rate of between 15 cfm/person and 20 cfm/person is required to maintain a $CO_2$ level of about 1000 ppm. Greater ventilation rates result in over-ventilation and energy wastage, and lesser ventilation rates result in less than ideal indoor air quality. By determining the number of people in a building, the amount of outdoor air required to maintain a desired indoor air quality can easily be established.

Figure 2:
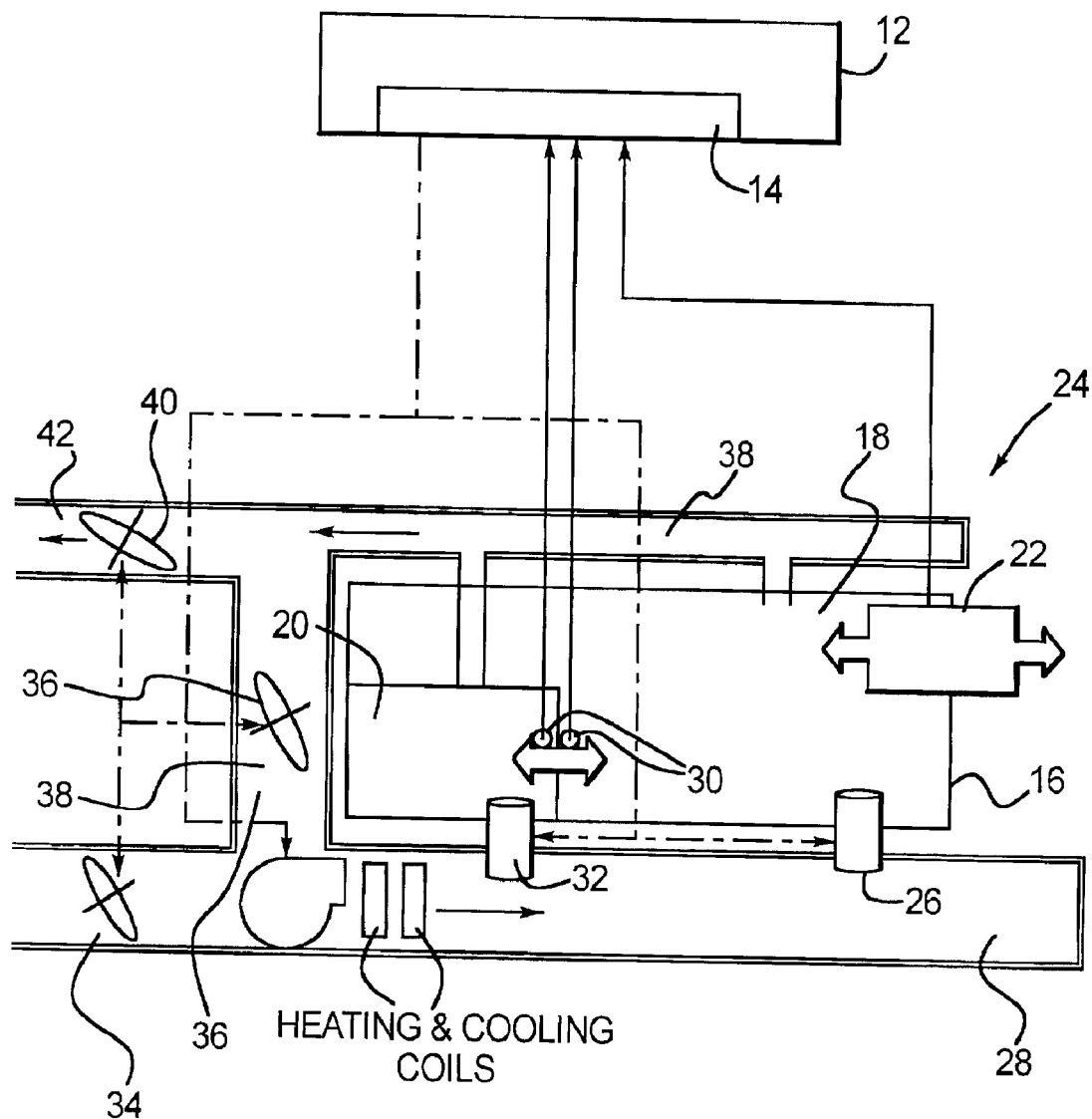
FIG. 2 illustrates a demand control ventilation system in accordance with an embodiment of the present invention.

As shown in FIG. 2, a demand control ventilation system 10 includes a controller 12 executing a demand control ventilation program 14 in order to control ventilation within a building 16. The building 16 is shown only with a workspace 18 and a conference room 20. However, it should be understood that the present invention can be used in buildings that are more complex than the building 16. The controller 12, for example, may be an XL 15i or other HVAC (Heating, Ventilating, and Air Conditioning) controller supplied by Honeywell International, Inc. or others.

The demand control ventilation system 10 relies on an access control system 22 in order to obtain data related to the actual occupancy (number of people) in the workspace 18. Based on this actual occupancy, the demand control ventilation system 10 can vary the rate of ventilation supplied to the workspace 18.

FIG. 3 shows a comparison between a constant air volume system and the demand control ventilation system 10. As can be seen from FIG. 3, a constant air volume system maintains a relatively low ventilation rate from 6:00 PM of one day to about 7:00 AM of the next. At 7:00 AM, the constant air volume system increases ventilation to a maximum, and maintains this level of ventilation until about 6:00 PM, regardless of the level of occupancy.

By contrast, the demand control ventilation system 10 increases ventilation as the level of occupancy increases, and decreases ventilation as the level of occupancy decreases. Accordingly, the demand control ventilation system 10 realizes considerable energy savings while, at the same time, maintaining an adequate level of indoor air quality.

As shown in FIG. 2, the controller 12 receives an input from the access control system 22 that provides an indication to the controller 12 each time a person enters or leaves the workspace 18 through an entrance/exit 24. By up counting or down counting each time a person enters or leaves the workspace 18, the controller 12 is able to maintain a count of the people currently in the building 16. Alternatively, the count may be maintained by the access control system 22 and periodically read by the controller 12.

The controller 12 provides an output to one or more dampers, such as a damper 26, that control the intake of outdoor air into the workspace 18 from an outside air duct 28. This output from the controller 12 is dependent upon the number of people currently in the workspace 18. For example, as shown in FIG. 1, if there are currently 100 people in the workspace 18, the controller controls the damper 26 so that between 1500 and 2000 cubic feet per minute of outdoor air is supplied to the interior of the workspace 18. As the number of people currently in the workspace 18 increases, the controller controls the damper 26 so that more outdoor air is supplied to the interior of the workspace 18. Similarly, as the number of people currently in the workspace 18 decreases, the controller controls the damper 26 so that less outdoor air is supplied to the interior of the workspace 18. Alternatively, the controller 12 could control the speed of a fan motor in order to regulate the amount of fresh air brought into the workspace 18. As a still further alternative, the controller 12 could control both the damper 26 and the speed of a fan motor in order to regulate the amount of fresh air brought into the workspace 18.

The controller 12 is also capable of controlling ventilation of the conference room 20 within the building 16. Conference rooms frequently require little ventilation, but sometimes require substantial ventilation. Accordingly, sensors 30, such as infrared sensors, are located in each of the doorways of the conference room 20 in such a way that people entering and exiting the conference room 20 can be distinguished and counted.

For example, one of the sensors 30 may be mounted farther away from the door of the conference room 20 and one of the sensors 30 may be mounted nearer this door. If a person enters the conference room 20, the farther away sensor senses the movement first and the sensor nearer the door senses the movement second in order to indicate that the person is entering the conference room 20. Thus, the count of people maintained for the workspace 18 is decreased and the count of people maintained for the conference room 20 is increased. Similarly, if a person leaves the conference room 20, the nearer sensor senses the movement first and the sensor farther away senses the movement second to indicate that the person is leaving the conference room 20. Thus, the count of people maintained for the workspace 18 is increased and the count of people maintained for the conference room 20 is decreased.

Accordingly, the controller 12 maintains a count of people in the conference room 20. Based on this count, the controller 12 controls a damper 32 in order to control the amount of the ventilation that the conference room 20 receives from the outdoor air duct 28.

The arrangement shown in FIG. 2 assumes that the workspace 18 has only one point of entry/exit. The access control system 22 is shown at this point of building entry/exit. However, if the workspace 18 has multiple points of entry/exit, each such entry/exit point preferably has an access control system, such as the access control system 22, coupled to the controller 12. Accordingly, the demand control ventilation program 14 registers people movement into and out of the workspace 18 and stores this data in a log file. This data is used to control the ventilation rate.

The controller 12 may also control other dampers. For example, as shown in FIG. 2, the controller 12 controls a damper 34 that is positioned in the outdoor air duct 28 so as to control the fresh air supplied to the entire building 16 based on the total number of people in the building 16. The controller 12 may also be arranged to control a damper 36 in a return air duct 38 and a damper 40 in an exhaust duct 42.

The demand control ventilation program 14 controls the damper position (and/or fan blower motor speed) to supply the required fresh air into the workspace. Temperature control may be provided by a separate proportional, integral, derivative (PID) control function.

FIG. 4 illustrates the physical layer of the demand control ventilation system 10 of FIG. 2. As shown in FIG. 4, the demand control ventilation program 14 maintains a count of people within the workspace 18 and within the conference room 20 in order to control the dampers 26 and 32 (as well as the dampers 34, 36, and 40 as appropriate) of an air handling unit 44 so as to maintain a desired level of ventilation for the workspace 18 and for the conference room 20.

Accordingly, when a person enters the conference room 20, the damper 32 is controlled so that the rate of air supply into the conference room 20 is increased by 20 cfm. On the other hand, when a person leaves the conference room 20, the damper 32 is controlled so that the rate of air supply into the conference room 20 is decreased by 20 cfm. Similarly, when a person enters the workspace 18, the damper 26 is controlled so that the rate of air supply into the workspace 18 is increased by 20 cfm. On the other hand, when a person leaves the workspace 18, the damper 26 is controlled so that the rate of air supply into the workspace 18 is decreased by 20 cfm.

Moreover, when a person leaves the workspace 18 and moves into the conference room 20, the rate of air supply into the workspace 18 is decreased by 20 cfm and the rate of air supply into the conference room 20 is increased by the same amount. Similarly, when a person leaves the conference room 20 and moves into the workspace 18, the rate of air supply into the conference room 20 is decreased by 20 cfm and the rate of air supply into the workspace 18 is increased by the same amount.

The dampers 34, 36, and 40 are also appropriately controlled.

In each of the above cases, the per-person based target ventilation is maintained and hence the steady state air quality inside the workspace 18 and conference room 20 is maintained at the desired level.

One or more temperature sensors, such as a temperature sensor 46, may be provided in order to measure the temperatures 48 within the workspace 18 and the conference room 20. The demand control ventilation program 14 may also implement a PID temperature control function in order to regulate a temperature controlling apparatus, such as cold/hot water valve actuators 50, so as to control the temperatures within the workspace 18 and the conference room 20.

The demand control ventilation program 14 may be executed in accordance with the flow chart shown in FIG. 5. As shown by a block 60 of the demand control ventilation program 14, occupancy data is accumulated so that a count of the people in the relevant spaces of the building 16, such as the workspace 18 and the conference room 20, is maintained. The block 60 also reads the temperature sensor 46 in order to determine the temperature within the building 16.

When it is time to adjust a damper, such as when the occupancy level of the workspace 18 or the conference room 20 changes, a block 62 determines the rate at which fresh air is to be supplied to the appropriate space based on the occupancy data accumulated by the block 60. For example, the block 62 may use the chart of FIG. 1 to determine the required fresh air based on the number of people in the workspace 18 and/or in the conference room 20.

Similarly, a block 64 determines the amount of heating and/or cooling required, if any, to bring the workspace 18 and/or the conference room 20 to the set point temperature, based on the temperature read by the block 60.

A block 66 controls the damper 26 and/or 32 (as well as the dampers 34, 36, and 40 as appropriate) based on the rate of fresh air determined by the block 62, and the block 66 controls a temperature regulating apparatus, such as a cold/hot water valve, based on the required heating and/or cooling determined by the block 64.

Certain modifications of the present invention have been discussed above. Other modifications will occur to those practicing in the art of the present invention. For example, as described above, the controller 12 controls the dampers 26 and 32 (as well as the dampers 34, 36, and 40 as appropriate) in order to regulate ventilation in their respective spaces. Alternatively, the controller 12 could control the speed of fan blower motors in order to regulate the amount of fresh air brought into the building 16 and/or the conference room 20. As a still further alternative, the controller 12 could control both the dampers 26 and 32 (as well as the dampers 34, 36, and 40 as appropriate) and the speed of fan blower motors in order to regulate the amount of fresh air brought into the building 16 and/or the conference room 20.

In addition, as shown above, the demand control ventilation system 10 includes only one temperature sensor 46. This temperature sensor 46 may be located at a central location with the building 16. Alternatively, a plurality of temperature sensors may be deployed throughout the building 16 in order to provide temperature control of individual spaces.

Moreover, the count of people within the workspace 18 is maintained based on the access control system 22. Instead, this count may be maintained based on outputs from sensors such as infrared sensors, electric eyes, etc.

Furthermore, as described above, the dampers 26 and 32 are controlled in order to control the supply of fresh air to the workspace 18 and the conference room 20. In addition, the controller 12 may be arranged to control the dampers 34, 36, and 40 based on the total count of the people within the building 16.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A method of controlling air quality comprising:
   maintaining a count of people in an area to be ventilated based on information provided by an access control system; and,
   ventilating the area with an amount of fresh air dependent on the count such that higher numbers of people in the area results in more ventilation than if one person is in the area.

2. The method of claim 1 wherein the maintaining of a count comprises maintaining the count also based on information from a sensor.

3. The method of claim 2 wherein the maintaining of the count also based on information from a sensor comprises maintaining the count also based on information from an infrared sensor.

4. The method of claim 1 further comprising controlling the temperature within the area.

5. The method of claim 1 wherein the ventilating of the area comprises increasing ventilation as the count increases and decreasing ventilation as the count decreases.

6. A method of controlling air quality comprising:
   maintaining a first count of people in a first space to be ventilated based on information from an access control system;
   maintaining a second count of people in a second space to be ventilated based on information from a sensor, wherein the first and second spaces are within the same building, and wherein the first and second counts are separate counts;
   ventilating the first space with an amount of air dependent on the first count; and,
   ventilating the second space with an amount of air dependent on the second count.

7. The method of claim 6 wherein the maintaining of the second count based on information from a sensor comprises maintaining the second count based on information from an infrared sensor.

8. The method of claim 6 further comprising controlling the temperature within at least one of the first and second spaces.

9. The method of claim 6 wherein the ventilating of the first space comprises increasing ventilation as the first count increases and decreasing ventilation as the first count decreases.

10. The method of claim 6 wherein the second space is accessed through the first space.

11. The method of claim 10 wherein the ventilating of the first space comprises increasing ventilation as the first count increases and decreasing ventilation as the first count decreases.

12. The method of claim 10 wherein the ventilating of the second space comprises increasing ventilation as the second count increases and decreasing ventilation as the second count decreases.

13. The method of claim 12 wherein the ventilating of the first space comprises increasing ventilation as the first count increases and decreasing ventilation as the first count decreases.

14. The method of claim 10 wherein the ventilating of the first and second spaces comprises decreasing ventilation to the first space and increasing ventilation to the second space when a person moves from the first space to the second space, and wherein the ventilating of the first and second spaces comprises increasing ventilation to the first space and decreasing ventilation to the second space when a person moves from the second space to the first space.

15. A method of controlling air quality comprising:
   maintaining a first count of people in a first space to be ventilated based on information from an access control system;
   maintaining a second count of people in a second space to be ventilated based on information from a sensor, wherein the first and second spaces are within the same building, and wherein the first and second counts are separate counts;
   controlling a first damper to supply fresh air to the first space dependent on the first count; and,
   controlling a second damper to supply fresh air to the second space dependent on the second count.

16. The method of claim 15 wherein the maintaining of the second count based on information from a sensor comprises maintaining the second count based on information from an infrared sensor.

17. The method of claim 15 further comprising controlling the temperature within at least one of the first and second spaces.

18. The method of claim 15 wherein the controlling of the first damper comprises increasing the fresh air supplied to the first space as the first count increases and decreasing the fresh air supplied to the first space as the first count decreases.

19. The method of claim 15 wherein the second space is accessed through the first space, wherein the controlling of the first damper comprises increasing the fresh air supplied to the first space as the first count increases and decreasing the fresh air supplied to the first space as the first count decreases.

20. The method of claim 15 wherein the second space is accessed through the first space, wherein the controlling of the second damper comprises increasing the fresh air supplied to the second space as the second count increases and decreasing the fresh air supplied to the second space as the second count decreases.

21. The method of claim 20 wherein the controlling of the first damper comprises increasing the fresh air supplied to the first space as the first count increases and decreasing the fresh air supplied to the first space as the first count decreases.

22. The method of claim 15 further comprising:
   maintaining a total count of people in the building; and,
   controlling a main building inlet damper and a main building exhaust damper dependent on the total count.

23. The method of claim 15 wherein the second space is accessed through the first space, wherein the controlling of the first and second dampers comprises decreasing the fresh air supplied to the first space and increasing the fresh air supplied to the second space when a person moves from the first space to the second space, and wherein the controlling of the first and second dampers comprises increasing the fresh air supplied to the first space and decreasing the fresh air supplied to the second space when a person moves from the second space to the first space.

24. A method of controlling air quality comprising:
   maintaining a first count of people in a first space to be ventilated;
   maintaining a second count of people in a second space to be ventilated, wherein the first and second spaces are within the same building, wherein the second space is accessed through the first space, and wherein the first and second counts are separate counts;

ventilating the first space with an amount of air dependent on the first count; and, ventilating the second space with an amount of air dependent on the second count, wherein the ventilating of the first and second spaces comprises decreasing ventilation to the first space and increasing ventilation to the second space when a person moves from the first space to the second space, and wherein the ventilating of the first and second spaces comprises increasing ventilation to the first space and decreasing ventilation to the second space when a person moves from the second space to the first space.

25. The method of claim 1 wherein the ventilating the area with an amount of fresh air dependent on the count comprises ventilating the area with an amount of outdoor air dependent on the count.

* * * * *